(12) United States Patent
Djenguerian et al.

(10) Patent No.: US 8,477,515 B2
(45) Date of Patent: Jul. 2, 2013

(54) METHOD AND APPARATUS TO LIMIT MAXIMUM SWITCH CURRENT IN A SWITCHING POWER SUPPLY

(71) Applicants: Alex B. Djenguerian, Saratoga, CA (US); Andrew J. Morrish, Saratoga, CA (US)

(72) Inventors: Alex B. Djenguerian, Saratoga, CA (US); Andrew J. Morrish, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/664,341

(22) Filed: Oct. 30, 2012

(65) Prior Publication Data

US 2013/0058138 A1    Mar. 7, 2013

Related U.S. Application Data

(60) Continuation of application No. 13/315,131, filed on Dec. 8, 2011, now Pat. No. 8,325,498, which is a continuation of application No. 13/009,676, filed on Jan. 19, 2011, now Pat. No. 8,089,781, which is a continuation of application No. 12/541,104, filed on Aug. 13, 2009, now Pat. No. 7,894,222, which is a division of application No. 11/177,091, filed on Jul. 8, 2005, now Pat. No. 7,593,245.

(51) Int. Cl.
*H02M 3/335*    (2006.01)
(52) U.S. Cl.
USPC ................. 363/21.12; 363/18; 363/21.13
(58) Field of Classification Search
USPC ........... 363/18, 20, 21.04, 21.05, 21.1, 21.11, 363/21.12, 21.13, 21.18; 323/282, 283, 284, 323/285

See application file for complete search history.

(56) References Cited

U.S. PATENT DOCUMENTS 4,616,301 A   10/1986   Small
4,716,510 A   12/1987   Pace et al.
(Continued)

FOREIGN PATENT DOCUMENTS

DE   100 16 859 A1   11/2000
EP   0 605 057 A2    7/1994
JP   09-163730       6/1997

OTHER PUBLICATIONS

EP 06 25 3518—European Search Report, dated Mar. 20, 2008 (Publication No. EP1.744.442) (6 pages).

(Continued)

*Primary Examiner* — Nguyen Tran
(74) *Attorney, Agent, or Firm* — Blakely Sokoloff Taylor & Zafman LLP

(57) ABSTRACT

An integrated circuit for use in a power supply includes a drive signal generator, a first delay, a second delay, a comparator, a first logic, a first short on time detector, and a second logic. The drive signal generator generates a drive signal to control a switch in response to a clock signal. The short on time detector sets the first latch indicating that an on time of the switch is a short on time. The second logic is coupled to detect long pulses of the drive signal to reset the first latch indicating that the on time of the switch is not a short on time. An on time of the drive signal is a short on time if a switch current of the switch exceeds a current limit after a sum of a leading edge blanking period and a current limit delay time period.

15 Claims, 6 Drawing Sheets

U.S. PATENT DOCUMENTS

| | | | |
|---|---|---|---|
| 4,791,544 A | 12/1988 | Gautherin et al. | |
| 4,928,200 A | 5/1990 | Redl et al. | |
| 5,088,016 A | 2/1992 | Vinciarelli et al. | |
| 5,164,659 A | 11/1992 | Schultz et al. | |
| 5,229,707 A | 7/1993 | Szepesi et al. | |
| 5,335,162 A | 8/1994 | Martin-Lopez et al. | |
| 5,559,683 A | 9/1996 | Schoenwald | |
| 5,825,234 A | 10/1998 | Sung et al. | |
| 5,852,550 A | 12/1998 | Majid et al. | |
| 6,011,706 A | 1/2000 | Adragna et al. | |
| 6,061,257 A | 5/2000 | Spampinato et al. | |
| 6,094,362 A | 7/2000 | Domingo | |
| 6,151,226 A | 11/2000 | Chen et al. | |
| 6,188,588 B1 | 2/2001 | Hemena et al. | |
| 6,344,980 B1 | 2/2002 | Hwang et al. | |
| 6,344,986 B1 | 2/2002 | Jain et al. | |
| 6,646,897 B1 | 11/2003 | Lomax, Jr. et al. | |
| 6,665,197 B2 | 12/2003 | Gong et al. | |
| 6,788,038 B1 | 9/2004 | Bell et al. | |
| 6,788,555 B2 | 9/2004 | Bourdillon et al. | |
| 6,879,501 B2 | 4/2005 | Mori | |
| 6,914,789 B2 | 7/2005 | Kinoshita et al. | |
| 6,980,444 B2 | 12/2005 | Takahashi | |
| 7,054,171 B1 | 5/2006 | Bailly et al. | |
| 7,110,270 B2 | 9/2006 | Balakrishnan et al. | |
| 7,161,815 B2 | 1/2007 | Mori | |
| 7,239,532 B1 | 7/2007 | Hsu et al. | |
| 7,259,972 B2 | 8/2007 | Yang | |
| 7,362,592 B2 | 4/2008 | Yang et al. | |
| 7,417,382 B2 | 8/2008 | Lin | |
| 7,613,019 B2 | 11/2009 | Kroes | |
| 2003/0062879 A1 | 4/2003 | Balakrishnan et al. | |
| 2003/0156433 A1 | 8/2003 | Gong et al. | |
| 2004/0145928 A1* | 7/2004 | Takada | 363/95 |
| 2004/0218405 A1 | 11/2004 | Yamada | |
| 2005/0024898 A1 | 2/2005 | Yang et al. | |
| 2005/0030776 A1 | 2/2005 | Lin | |
| 2005/0213358 A1* | 9/2005 | Feldtkeller | 363/95 |
| 2006/0007714 A1 | 1/2006 | Hua | |
| 2006/0056204 A1 | 3/2006 | Yang et al. | |
| 2006/0077697 A1 | 4/2006 | Yang | |
| 2006/0171177 A1 | 8/2006 | Asao | |
| 2007/0008756 A1 | 1/2007 | Djenguerian et al. | |
| 2007/0103944 A1* | 5/2007 | Mori | 363/21.12 |

OTHER PUBLICATIONS

EP 06 25 3531—Partial European Search Report, dated Jun. 17, 2010. (8 pages).

Choi, H-S et al., "Protection Schemes for Various Fault Conditions for Off-line Flyback Converters," Power Electronics Specialists Conference, 35$^{th}$ Annual IEEE, Germany, 2004, pp. 4355-4359. (5 pages).

Texas Instrument Incorporated, "UC1825/UC2825/UC3825 High Speed PWM Controller," SLUS235A, ppl-8 and addendum, Mar. 1997, Revised Mar. 2004. (17 pages).

JP 189045/2006—First Office Action, mailed Aug. 2, 2011 (4 pages).

* cited by examiner

METHOD AND APPARATUS TO LIMIT MAXIMUM SWITCH CURRENT IN A SWITCHING POWER SUPPLY

REFERENCE TO PRIOR APPLICATION

This application is a continuation of U.S. application Ser. No. 13/315,131, filed Dec. 8, 2011, now pending, which is a continuation of U.S. application Ser. No. 13/009,676, filed Jan. 19, 2011, now U.S. Pat. No. 8,089,781, which is a continuation of U.S. application Ser. No. 12/541,104, filed Aug. 13, 2009, now U.S. Pat. No. 7,894,222, which is a divisional of U.S. application Ser. No. 11/177,091, filed Jul. 8, 2005, now U.S. Pat. No. 7,593,245. U.S. patent application Ser. No. 13/315,131 and U.S. Pat. Nos. 8,089,781, 7,894,222 and 7,593,245 are hereby incorporated by reference.

BACKGROUND

1. Technical Field

The present invention relates generally to electronic circuits, and more specifically, the invention relates to switched mode power supplies.

2. Background Information

Switches in switching power supplies can sustain damage from excess voltage, excess current, or particular combinations of voltage and current. The instantaneous voltage and current must remain within a boundary defined as the safe operating area to prevent damage to the switch. Therefore, controllers for switching power supplies usually measure voltage and current for the purpose of protecting the switch as well as for regulating an output.

Conflicting requirements and limitations of real devices often make it impossible or impractical for controllers to measure the quantities necessary to protect the switch under all conditions. Whereas maximum voltage on the switch can usually be deduced from a simple measurement of the dc input voltage, measurement of the current in the switch is usually much more difficult.

Controllers typically must mask the measurement of switch current at certain times in the switching period to avoid false indications of excess current. Moreover, there will always be some delay between the detection of excess current and an appropriate response. Thus, conventional methods may be unable to protect the switch from damage under certain conditions of transient loading or faults.

BRIEF DESCRIPTION OF THE DRAWINGS

The present invention detailed illustrated by way of example and not limitation in the accompanying Figures.

DETAILED DESCRIPTION

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, or characteristics may be combined in any suitable manner in one or more embodiments.

Techniques are disclosed to prevent excess current in a switch of a switching power supply. For example, a method and apparatus are disclosed to prevent damage to a power transistor in a switching power supply from conditions that are outside its safe operating area. During start-up or overload when the power supply has a low output voltage, traditional techniques that respond to excessive current in the power switch cannot prevent the current from going higher in each switching period because leading edge blanking time and current limit delay time impose a minimum on time of the switch while the low output voltage causes the controller to demand a minimum off time of the switch. To overcome the problems with the traditional techniques of direct measurement of current in the switch, a disclosed method uses a measurement of time as an indirect indication of excess current in the switch. For instance, one disclosed technique measures the conduction time of the switch rather than the current in the switch to recognize a condition of uncontrolled increasing current. A short conduction time implies excessive switch current. The response to one or more short conduction times is a delay in the next switching period, effectively extending the off time to allow the current to decrease to a safe value before the next on time of the switch.

Figure 1:
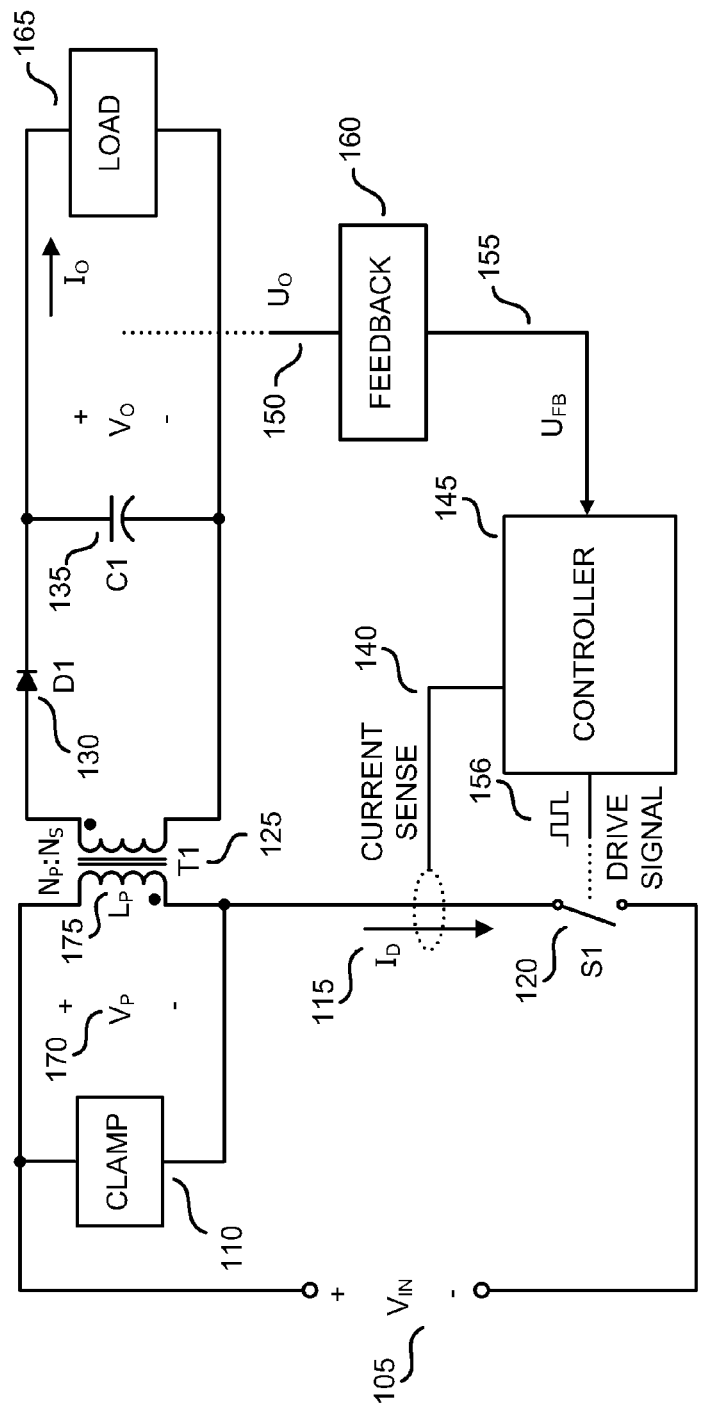
FIG. 1 is a functional block diagram of one embodiment of a switching power supply that may limit peak current in a power switch in accordance with the teaching of the present invention.
Figure 1:
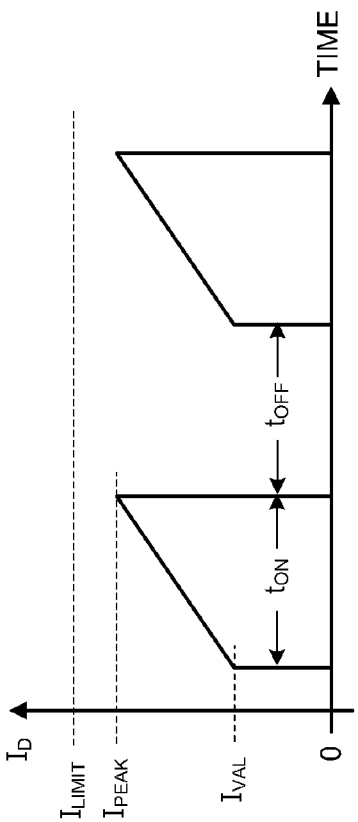

To illustrate, FIG. 1 shows generally a functional block diagram of a power supply for an embodiment of a power supply that limits peak switch current in accordance with the teachings of the present invention. The topology of the example power supply illustrated in FIG. 1 is a flyback regulator. It is appreciated that there are many topologies and configurations of switching regulators, and that the flyback topology shown in FIG. 1 is provided for explanation purposes and that other types of topologies may also be employed in accordance with the teachings of the present invention.

As illustrated in the power supply example of FIG. 1, an energy transfer element T1 125 is coupled between an unregulated input voltage $V_{IN}$ 105 and a load 165 at an output of the power supply. A power switch S1 120 is coupled to the primary winding 175 at an input of energy transfer element 125 to regulate the transfer of energy from the unregulated input voltage $V_{IN}$ 105 to the load 165 at the output of the power supply. A controller 145 is coupled to generate a drive signal 156 that is coupled to be received by the power switch S1 120 to control switching of power switch S1 120. As will be discussed below, controller 145 also includes a short on time detector to sense power switch S1 to detect an occurrence of a threshold number of one or more consecutive short on times of power switch S1 120. For one embodiment, a frequency adjuster is also included in the controller 145 and coupled to the short on time detector. The frequency adjuster is used for one embodiment to adjust an oscillating frequency of an oscillator included in the controller in response to the short on time detector.

In the example of FIG. 1, the energy transfer element T1 125 is illustrated as a transformer with two windings. A primary winding 175 has $N_P$ turns with an inductance $L_P$. A secondary winding has $N_S$ turns. In general, the transformer can have more than two windings, with additional windings to provide power to additional loads, or to provide bias voltages, or to sense the voltage at a load, or the like.

A clamp circuit 110 is coupled to the primary winding 175 of the energy transfer element T1 125 to control the maximum voltage on the power switch S1 120. As mentioned, power switch S1 120 is switched on and off with a drive signal 156 generated by a controller circuit 145. For one embodiment, switch S1 120 is a transistor such as for example a power metal oxide semiconductor field effect transistor (MOSFET). For one embodiment, controller 145 includes integrated circuits and discrete electrical components. The operation of switch S1 120 produces pulsating current in the rectifier D1 130 that is filtered by capacitor C1 135 to produce a substantially constant output voltage $V_O$ or a substantially constant output current $I_O$ at the load 165.

The output quantity to be regulated is $U_O$ 150, that in general could be an output voltage $V_O$, an output current $I_O$, or a combination of the two. A feedback circuit 160 is coupled to the output quantity $U_O$ 150 to produce a feedback signal $U_{FB}$ 155 that is an input to the controller 145. Another input to the controller 145 is the current sense signal 140 that senses a current $I_D$ 115 in switch S1 120. Any of the many known ways to measure a switched current, such as for example a current transformer, or for example the voltage across a discrete resistor, or for example the voltage across a transistor when the transistor is conducting, may be used to measure current $I_D$ 115. The controller may use current sense signal 140 to regulate the output $U_O$ 150 or to prevent damage to the switch S1 120.

FIG. 1 also illustrates an example waveform for current $I_D$ 115 through power switch S1 120 under ideal conditions. The power switch S1 120 conducts for a time $t_{ON}$ in response to a pulse in the drive signal 156 from controller 145. Power switch S1 120 is open for an off time $t_{OFF}$ in response to the drive signal 156 from controller 145. During the time of conduction $t_{ON}$, the current increases linearly with time from an initial current $I_{VAL}$ to a final current $I_{PEAK}$ in response to the input voltage $V_{IN}$ 105 that is imposed across the inductance $L_P$ of the primary winding 175 of the transformer T1 125 when the switch S1 120 is conducting.

For one embodiment, controller 145 operates switch S1 120 to substantially regulate the output $U_O$ 150 to its desired value. For one embodiment, controller 145 increases conduction time $t_{ON}$ of the switch S1 120 when output $U_O$ 150 is less than its desired value. For one embodiment, controller 145 decreases conduction time $t_{ON}$ of the switch S1 120 when output $U_O$ 150 is greater than its desired value. For one embodiment, controller 145 maintains a constant conduction time $t_{ON}$ of the switch S1 120 when switch S1 120 conducts, and the off time $t_{OFF}$ is adjusted to regulate the output $U_O$ 150. For one embodiment, switching periods are skipped to make discrete adjustments to the off time $t_{OFF}$.

For one embodiment, controller 145 adjusts the operation of the switch S1 120 with the drive signal 156 to prevent operation outside its safe operating area. For one embodiment, controller 145 reduces conduction time $t_{ON}$ of the switch S1 120 when current $I_D$ 115 exceeds a current limit $I_{LIMIT}$. For one embodiment, controller 145 increases off time $t_{OFF}$ when current $I_D$ 115 exceeds a current limit $I_{LIMIT}$.

Figure 2:
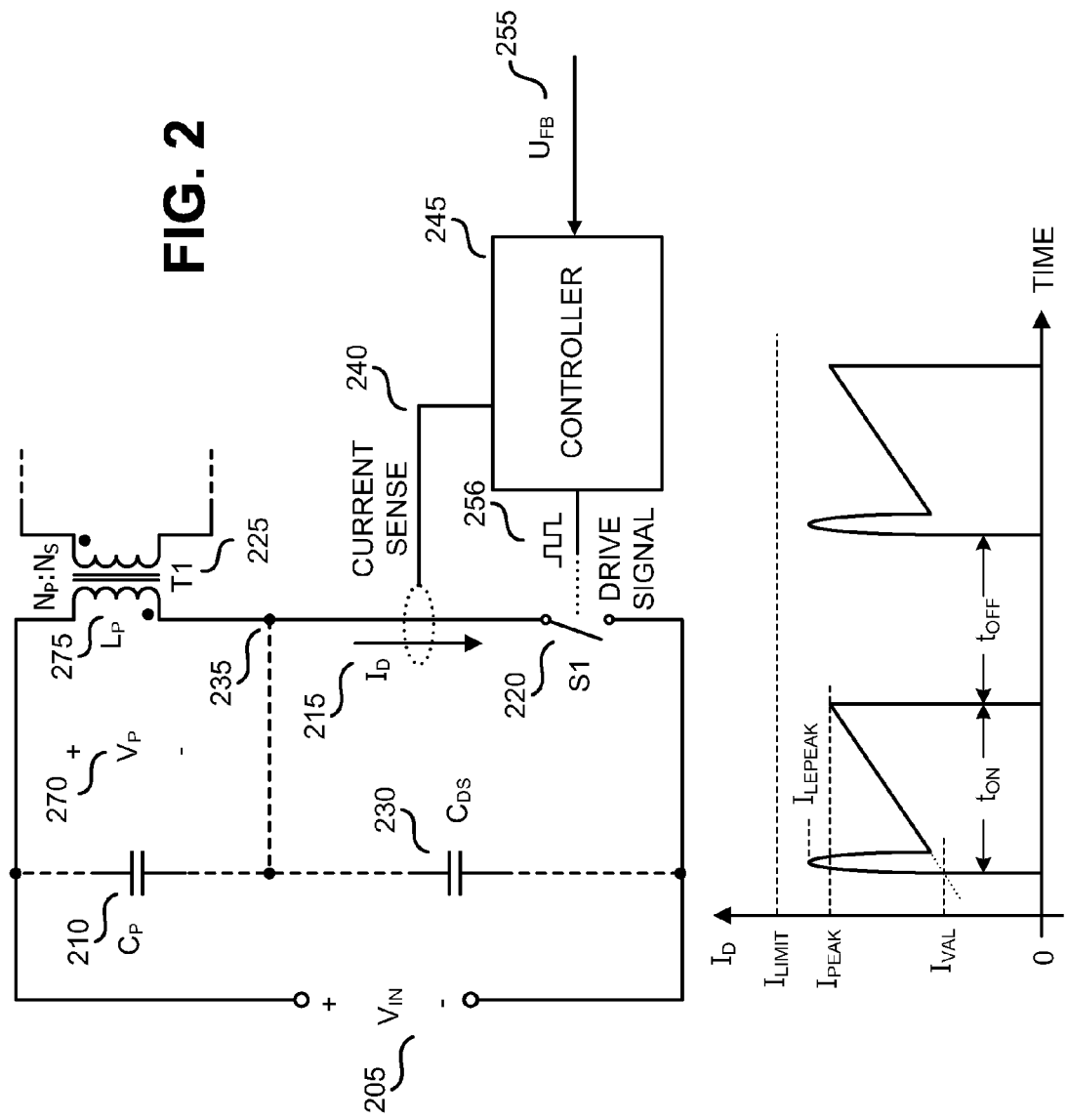
FIG. 2 is a section of a functional block diagram of one embodiment of a switching power supply that shows the contribution of parasitic capacitance to the current in the power switch.
Figure 3:
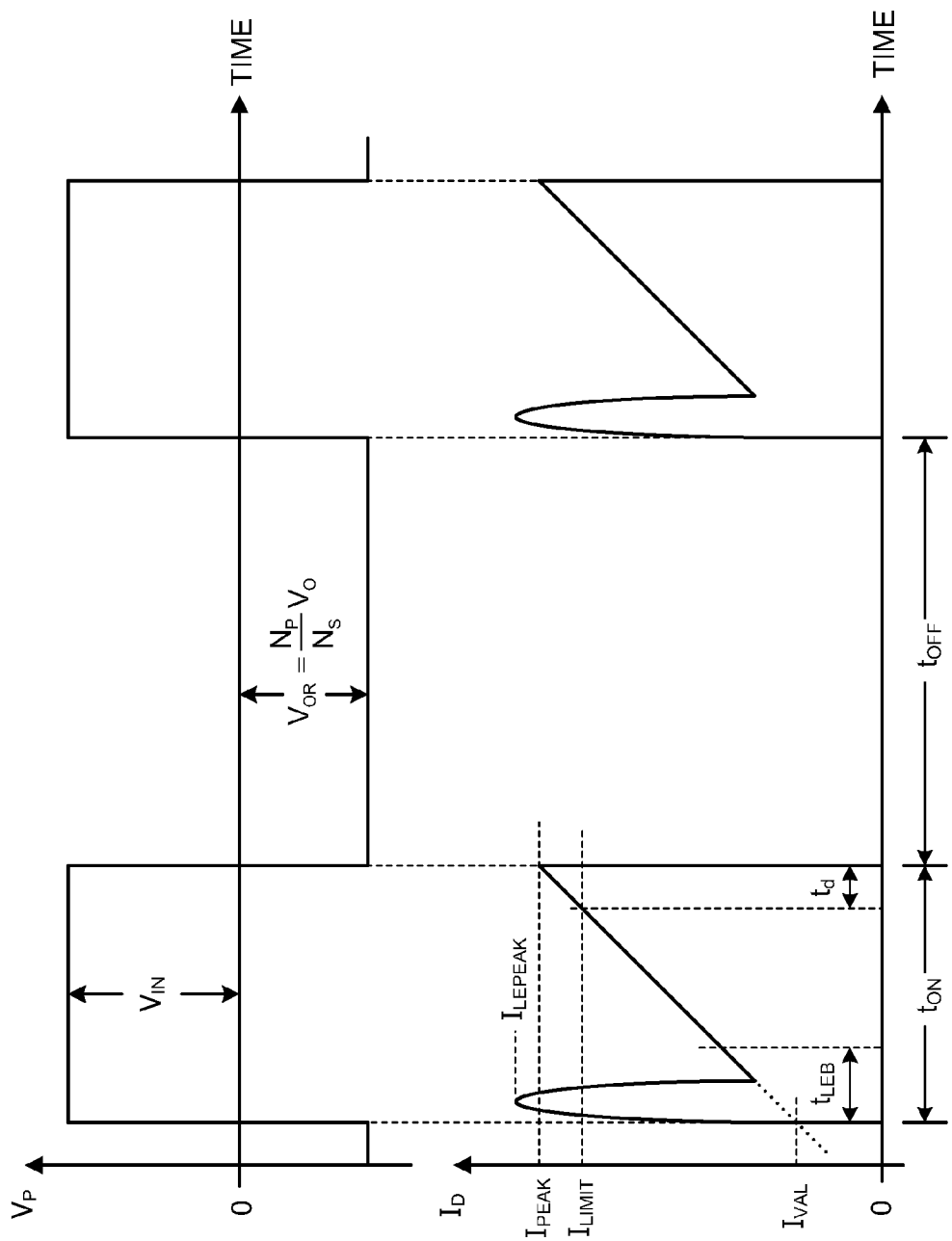
FIG. 3 shows voltage and current waveforms from one embodiment of a switching power supply that may limit peak current in a power switch in accordance with the teaching of the present invention.

FIG. 2 shows the contribution of stray capacitance to the current $I_D$ 215 that is measured in switch S1 220. Charging and discharging of stray capacitance represented by capacitors $C_P$ 210 and $C_{DS}$ 230 coupled to switch S1 at node 235 augments the current $I_D$ 215 for a short time after switch S1 220 turns on. FIG. 3 shows the voltage $V_P$ 270 on inductance $L_P$ of primary winding 275 of transformer T1 225. For one embodiment, voltage $V_P$ is positive with magnitude $V_{IN}$ during the on time $t_{ON}$. For one embodiment, voltage $V_P$ is negative with magnitude $V_{OR}$ during the off time $t_{OFF}$. The abrupt reversal of polarity in voltage $V_P$ adds a leading edge current to the initial current $I_{VAL}$ of switch S1 220. The waveforms in FIG. 2 and FIG. 3 show a peak leading edge current $I_{LEPEAK}$ that is greater than the ideal initial current $I_{VAL}$. For one embodiment, the peak leading edge current $I_{LEPEAK}$ is also greater than final current $I_{PEAK}$. The stray capacitance that is present in every practical circuit can produce a high leading edge current that can interfere with the ability of a controller to regulate an output or to protect a switch. A controller that responds to the magnitude of switch current $I_D$ 215 to regulate an output or to protect a switch would also respond to the leading edge current that is not significantly related to the regulation of the output or to the safe operation of the switch. To avoid interference from leading edge current, controllers typically mask the measurement of current in the switch until after a leading edge blanking time $t_{LEB}$. The relationship of leading edge blanking time t B to the conduction time $t_{ON}$ is shown in FIG. 3.

The leading edge blanking time t B is long enough to guarantee that the contribution of current from stray capacitance is negligible before the current $I_D$ becomes visible to the controller. FIG. 3 also shows current limit delay time $t_d$ that is the difference between the time $I_D$ reaches $I_{LIMIT}$ after $t_{LEB}$ and the time when the switch stops conducting. Current limit delay time $t_d$ is always present because practical circuits cannot respond instantaneously. Finite current limit delay time $t_d$ has a consequence of peak current $I_{PEAK}$ at the end of conduction time $t_{ON}$ being greater than current limit $I_{LIMIT}$.

Figure 4:
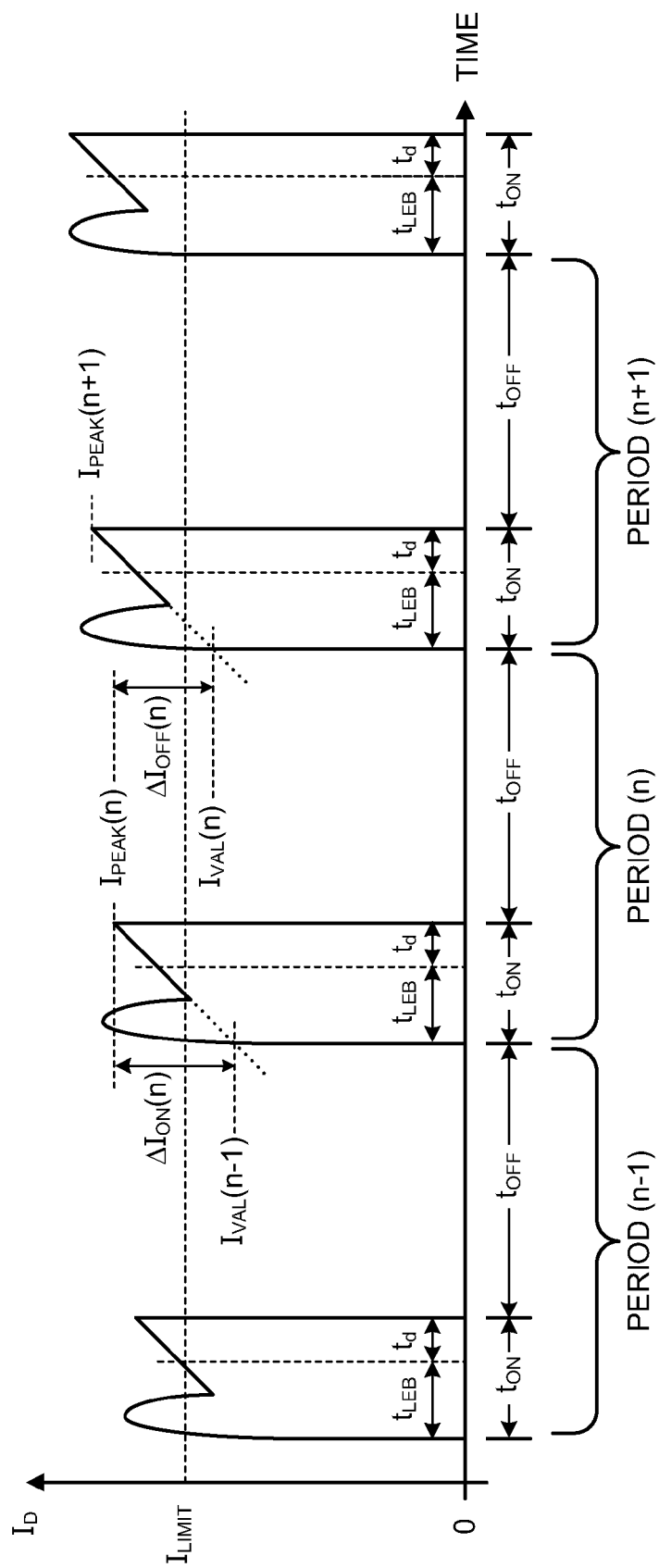
FIG. 4 illustrates important parameters of current waveforms from a switching power supply that does not limit peak current in a power switch in accordance with the teaching of the present invention.

Leading edge blanking time $t_{LEB}$ and current limit delay $t_d$ can make it impossible for typical controllers to limit the switch current $I_D$. FIG. 4 illustrates an undesirable situation that can occur in a switching power supply with a typical controller when the output is less than its regulated value. In FIG. 4, an overload at the output causes the switch current $I_D$ to exceed $I_{LIMIT}$ in every switching period. The overload has also caused the output voltage $V_O$ to drop far below its regulated value. The controller measures switch current $I_D$ at the end of leading edge blanking time $t_{LEB}$, and the switch opens after current limit delay time $t_d$. The detection of $I_D$ greater than $I_{LIMIT}$ cannot reduce the on time $t_{ON}$ below the sum of $t_{LEB}$ plus $t_d$. For one embodiment of the present invention, a short on time may be considered as the on time of the switch, or for example a pulse width of the drive signal, having an on time approximately equal to the sum of $t_{LEB}$ plus $t_d$.

FIG. 4 shows that in any switching period (n), the current that appears as switch current $I_D$ during the on time (exclusive of any current from parasitic capacitance) increases by amount $\Delta I_{ON}$ during the on time to reach $I_{PEAK}$, and then decreases from $I_{PEAK}$ by an amount $\Delta I_{OFF}$ during the off time. The changes in current are related to the input and output voltages by Equation 1 and Equation 2.

$$\Delta I_{ON} = \frac{V_{IN} t_{ON}}{L_P} = \frac{V_{IN}(t_{LEB} + t_d)}{L_P} \quad \text{Equation 1}$$

$$\Delta I_{OFF} = \frac{V_{OR} t_{OFF}}{L_P} = \left(\frac{N_P}{N_S}\right)\frac{V_O t_{OFF}}{L_P} \quad \text{Equation 2}$$

It is clear from FIG. 4 that when $\Delta I_{ON} > \Delta I_O$ for every consecutive pulse or switching period, the peak current of the next switching period (n+1) will be greater than the peak current in the present switching period (n). An overload condition that reduces the output voltage $V_O$ substantially below its regulated value will cause the control circuit to make the off time $t_{OFF}$ as small as possible. Equation 2 shows that reduction of $V_O$ with constant or reduced $t_{OFF}$ will reduce $\Delta I_{OFF}$. Equation 1 shows that the leading edge blanking time $t_{LEB}$ and the current limit delay time $t_d$ impose a minimum value on $\Delta I_{ON}$. Therefore, the usual method of control will allow $\Delta I_{ON}$ to be greater than $\Delta I_{OFF}$ during an overload of the output. When $\Delta I_{ON}$ is greater than $\Delta I_{OFF}$, the current and voltage can go outside the safe operating area of the switch after only a few consecutive switching periods in which there are short on times that are for example approximately equal in time to the sum of $t_{LEB}$ plus $t_d$. Fault detection circuits that respond only after many switching periods are unable to protect the switch from failure. The controller must respond within a small number of switching periods to keep the operation of the switch within its safe operating area. For an embodiment of the present invention, the occurrence of one or more consecutive short on times of the switch, which have an on time approximately equal to the sum of $t_{LEB}$ plus $t_d$, may indicate a fault condition.

As will be discussed, a short on time detector may be included for an embodiment of the present invention, which will detect the occurrence of a threshold number of one or more consecutive short on times of power switch S1 120 or 220. For one embodiment, the threshold number may be equal to one. For another embodiment, the threshold number may be equal to two or greater depending on the design. If an occurrence of the threshold number of one or more consecutive short on times in power switch S1 120 or 220 is detected, the next pulse of the drive signal is delayed, which will increase $\Delta I_{OFF}$ to reduce the starting value $I_{VAL}$ of the switch current $I_D$ through the power switch S1 120 or 220, thereby reducing the chance of the switch current $I_D$ from exceeding the current limit in accordance with the teachings of the present invention.

Figure 5:
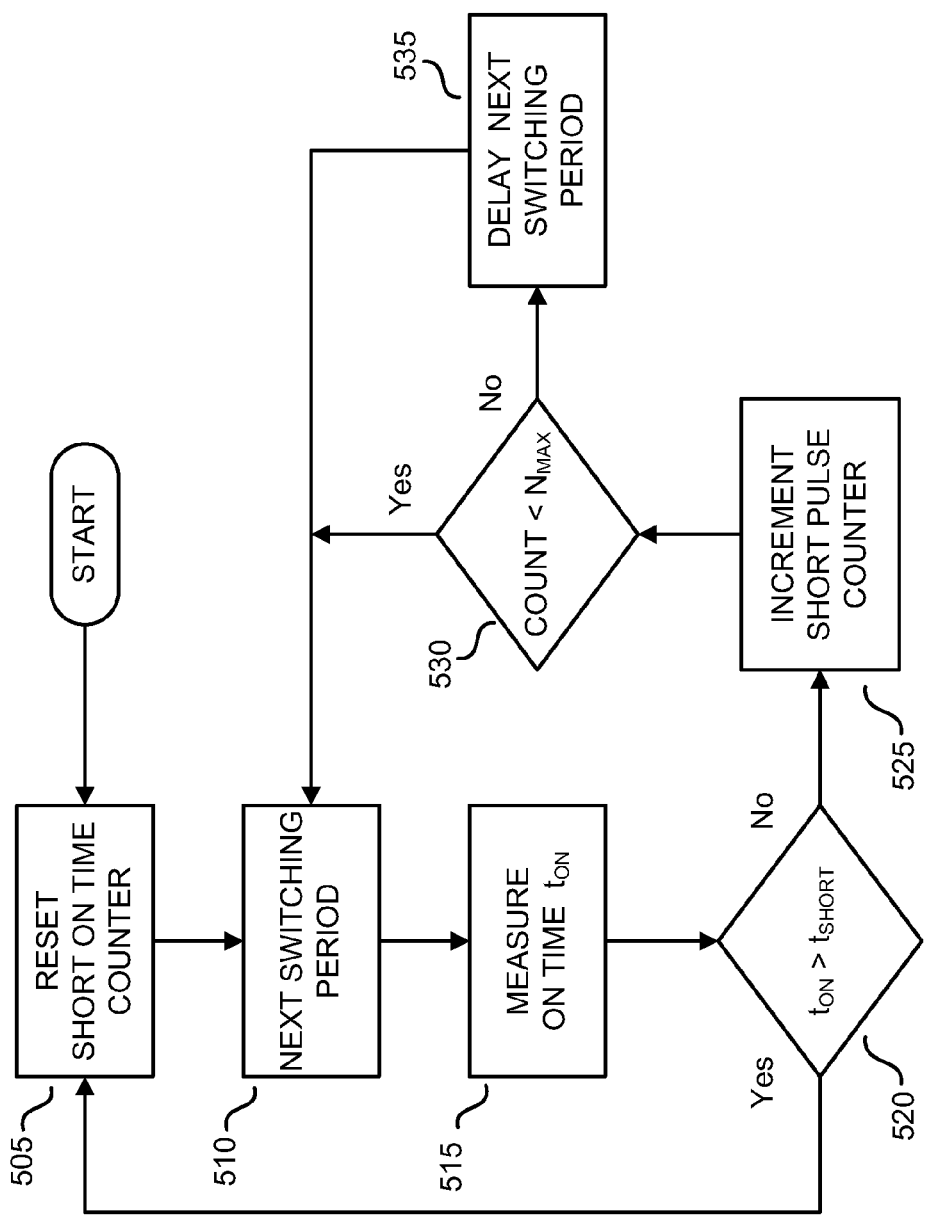
FIG. 5 is a flow diagram that illustrates a method to limit peak current in a power switch in accordance with the teaching of the present invention.

FIG. 5 is a flow diagram that describes a method to keep the operation of the switch within its safe operating area. In general, for one embodiment, the method for regulating a power supply in accordance with the teachings of the present invention includes switching a power switch coupled to an energy transfer element at an input of a power supply in response to a drive signal responsive to feedback received from an output the power supply. If an occurrence of a threshold number of one or more consecutive short on times of the switch is detected, then a next pulse of the drive signal is delayed in response to the occurrence of the threshold number of one or more consecutive short on times of the switch in accordance with the teachings of the present invention.

In particular, for one embodiment, the method measures the on time of the switch to determine whether or not an alternative control action is required to prevent the peak switch current $I_{PEAK}$ from getting too high. For the purposes of the method illustrated in FIG. 5, a short on time is any on time $t_{ON}$ that is not greater than a threshold on time $t_{SHORT}$. For one embodiment, $t_{SHORT}$ is slightly greater than the sum of $t_{LEB}$ plus $t_d$. A short on time counter that counts the number of short on times is reset in block 505 before the controller begins the next switching period in block 510. The on time $t_{ON}$ is measured in block 515, and compared to the threshold on time $t_{SHORT}$ in block 520. If the on time $t_{ON}$ is greater than the threshold on time $t_{SHORT}$, the short on time counter is reset in block 505. If the on time $t_{ON}$ is not greater than the threshold on time $t_{SHORT}$, the short on time counter is incremented in block 525. The count of the short on time counter is compared to a maximum number of counts $N_{MAX}$ in block 530. If the number of consecutive short on times is less than $N_{MAX}$, then the next switching period begins after the usual off time for regulation $t_{OFF}$ in block 510. If the number of short on times is not less than $N_{MAX}$, then starting time of the next switching period is delayed in block 535. It is appreciated that at block 535, an occurrence of the threshold number of one or more consecutive short on times is detected. The number of consecutive short on times $N_{MAX}$ can be changed to suit particular applications. For one embodiment the number of consecutive short on times $N_{MAX}$ is fixed permanently for each application. For one embodiment, the number of consecutive short on times $N_{MAX}$ is one. For one embodiment, the number of consecutive short on times $N_{MAX}$ is two. For one embodiment, the number of consecutive short on times $N_{MAX}$ can change dynamically during operation of the power supply in response to conditions or events chosen by the designer.

Figure 6:
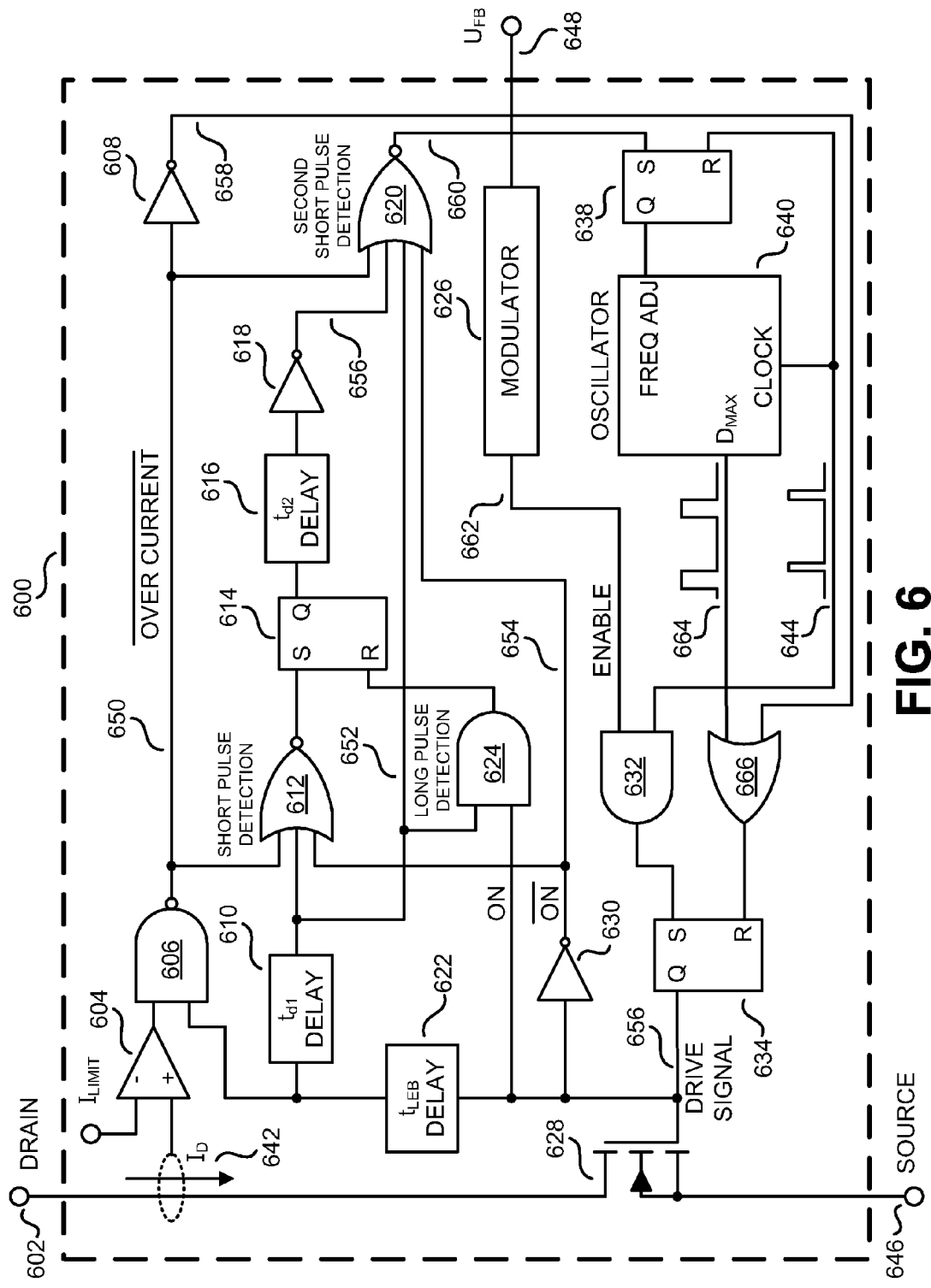
FIG. 6 is a functional block diagram of an integrated circuit that limits peak current in an included power switch in accordance with the teachings of the present invention.

FIG. 6 shows one embodiment of the method of the present invention in an integrated circuit. Integrated circuit 600 includes power MOSFET switch 628 that is coupled to a drain terminal 602 and a source terminal 646. Switch 628 is coupled to be switched in response to the drive signal 656, which is output from latch 634. A terminal 648 receives a feedback signal $U_{FB}$. For one embodiment, integrated circuit 600 may optionally include a plurality of other terminals to receive signals and to perform functions that are not described in this example.

In the example of FIG. 6, a modulator 626 interprets the feedback signal $U_{FB}$ from terminal 648 to determine whether an enable signal 662 should be high or low. An oscillator 640 provides a clock signal 644 and a maximum on time signal $D_{MAX}$ 664. In the illustrated example, the oscillator 640 includes a FREQ ADJ terminal coupled to an output of latch 638. For one embodiment, the frequency of oscillator 640 changes from a higher frequency to a lower frequency in response to the output of latch 638. Switch 628 responds to the drive signal 656 output from latch 634 that receives signals from AND gate 632 and OR gate 666. Switch 628 is on if both clock 644 and enable 662 are high while both $D_{MAX}$ 644 and OVER CURRENT 658 are low. Switch 628 is off if either $D_{MAX}$ 664 or OVER CURRENT 658 is high.

In the illustrated example, the threshold number of consecutive on times, or, the maximum number of short on times $N_{MAX}$ is two. Accordingly, the latch 638 delays the next switching period after two consecutive short on times by causing oscillator 640 to operate temporarily at a lower frequency in accordance with the teachings of the present invention. The lower frequency has a corresponding longer off time than the higher frequency. A current sensor or limiter is realized with current limit comparator 604, which presents a logic high at a first input of NAND gate 606 when drain current $I_D$ 624 exceeds a current limit threshold $I_{LIMIT}$. When switch 628 turns on at the start of a switching period, a second input of NAND gate 606 receives a logic high input after a delay of leading edge blanking time $t_{LEB}$ 622 in response to a high output of drive signal 656 from latch 634. For one embodiment, the leading edge blanking time $t_{LEB}$ is approximately 220 nanoseconds.

As illustrated in the example shown in FIG. 6, a short on time detector is realized in accordance with the teachings of the present invention with NOR gate 612 detecting short pulses from the inputs of inverted OVER CURRENT signal 650, inverted ON signal 654, and delayed ON signal 652. Delayed ON signal 652 is delayed from an active drive signal 656 by leading edge blanking time $t_{LEB}$ 622 and further delayed by a time $t_{d1}$ 610. Delay time $t_{d1}$ 610 is selected to be sufficiently greater than the delay of current limit comparator 604 to guarantee detection of every short on time. For one embodiment, current limit delay time $t_{d1}$ is approximately 100 nanoseconds.

In the example of FIG. 6, AND gate 624 detects long pulses, that are at least as long as the sum of $t_{LEB}$ and $t_{d1}$. Detection of a short pulse by NOR gate 612 sets latch 614. Latch 614 is reset by the detection of a long pulse from AND gate 624.

In the example of FIG. 6, a short on time detector is further realized in accordance with the teachings of the present invention with NOR gate 620 detecting the occurrence of a second short pulse to set latch 638 after two consecutive short pulses. NOR gate 620 receives the same three signals 650, 652, and 654 as NOR gate 612 plus a fourth signal, drive signal 656. The drive signal 656 is represented at the output of latch 614 and delayed by delay $t_{d2}$ 616 and inverted by inverter 618. Delay $t_{d2}$ 616 is sufficiently greater than delay $t_{d1}$ 610 to prevent NOR gate 620 from detecting the first short pulse. For one embodiment, delay $t_{d2}$ 616 is 230 nanoseconds.

In the example of FIG. 6, detection of the second consecutive short on time produces a logic high at the output 660 of NOR gate 620 to set latch 638. A frequency adjuster is realized in accordance with the teachings of the present invention with latch 638 and the FREQ ADJ input of oscillator 640. For one embodiment, when latch 638 is set, oscillator 640 changes from a higher frequency to a lower frequency, which effectively delays the start of the next switching period in accordance with the teachings of the present invention. For one embodiment, oscillator 640 is configured such that setting latch 638 and thereby activating the FREQ ADJ input of oscillator 640 causes the next pulse of the drive signal to be skipped, which effectively causes the frequency of oscillator 640 to be reduced in accordance with the teachings of the present invention. Latch 638 is reset at the start of the next switching period by CLOCK signal 644. If the next pulse is also a short pulse, latch 638 will be set again, reducing the frequency of the oscillator to delay the start of the next switching period. If the next pulse is a long pulse, there will be no delay in the next switching period, and two consecutive short times of switch 628 will be required to set latch 638 in the illustrated example.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. An integrated circuit for use in a power supply, the integrated circuit comprising:
   a drive signal generator configured to generate a drive signal in response to a clock signal to control switching of a switch included in the power supply;
   a first delay coupled to receive the drive signal and to generate a first delayed drive signal that is delayed by a leading edge blanking time;
   a second delay coupled to receive the first delayed drive signal and to generate a second delayed drive signal that is further delayed by a current limit delay time;
   a comparator coupled to detect whether a switch current through the switch exceeds a current limit;
   a first logic coupled to receive an output of the comparator and the first delayed drive signal, wherein the first logic generates an over current signal indicating that the switch current exceeds the current limit after the leading edge blanking time;
   a first short on time detector coupled to receive the over current signal, the second delayed drive signal, and a signal indicating whether the switch is on, wherein the first short on time detector sets a first latch indicating that an on time of the switch is a short on time if the switch current exceeds the current limit after a sum of the leading edge blanking time and the current limit delay time; and
   a second logic coupled to receive the drive signal and the second delayed drive signal to detect long pulses of the drive signal, wherein the second logic is coupled to reset the first latch indicating that the on time of the switch is not a short on time if the on time of the switch is greater than a sum of the leading edge blanking period and the current limit delay time period.

2. The integrated circuit of claim 1, further comprising a second short on time detector coupled to receive an output of the first latch, the over current signal, the second delayed drive signal, and the signal indicating whether the switch is on, wherein the second short on time detector is configured to set a second latch indicating that consecutive on times of the drive signal are short on times.

3. The integrated circuit of claim 1, wherein:
   the first short on time detector includes a first NOR gate;
   the first logic includes a NAND gate;
   the second logic includes an AND gate; and
   the second short on time detector includes a second NOR gate.

4. The integrated circuit of claim 1, further comprising:
   a frequency adjustor including a second latch coupled to be set in response to the first short on time detector determining that the on time is a short on time; and
   an oscillator configured to generate the clock signal and having a frequency adjust input coupled to the frequency adjustor, wherein the oscillator changes a frequency of the clock signal from a first frequency to a lower second frequency in response to an output of the second latch to delay a next switching period of the drive signal after the short on time.

5. The integrated circuit of claim 4, wherein the oscillator changes the frequency of the clock signal back to the first frequency at the start of the next switching period of the drive signal after the short on time.

6. The integrated circuit of claim 1, wherein the switch is included in the integrated circuit.

7. The integrated circuit of claim 1, further comprising a terminal to be coupled to receive a feedback signal representative of an output of the power supply, wherein the drive signal generator is configured to generate the drive signal to control switching of the switch to regulate the output of the power supply in response to the clock signal and in response to the feedback signal.

8. An integrated circuit for use in a power supply, the integrated circuit comprising:
   a drive signal generator configured to generate a drive signal having a switching frequency, the drive signal to control switching of a switch included in the power supply; and
   a short on time detector coupled to the drive signal generator to provide an output indicating whether an on time of the drive signal is a short on time, wherein the on time of the drive signal is a short on time if a switch current of the switch exceeds a current limit and if the on time of the switch is less than or equal to a sum of the leading edge blanking period and a current limit delay time period, wherein
      the switching frequency of the drive signal changes from a first frequency to a lower second frequency in response to the output of the short on time detector indicating that the on time of the drive signal is a short on time to delay a next switching period of the drive signal after the short on time.

9. The integrates circuit of claim 1, wherein the on time of the drive signal is a short on time if the switch current of the switch exceeds a current limit after the leading edge blanking period and if the on time of the switch is less than or equal to a sum of the leading edge blanking period and a current limit delay time period.

10. The integrated circuit of claim 8, wherein the short on time detector comprises:
   a first logic gate coupled to the drive signal generator to indicate that a first on time of the drive signal is a short on time if, during a first switching period of the drive signal, the switch current of the switch exceeds the current limit after the leading edge blanking period and the on time of the switch is less than or equal to the sum of the leading edge blanking period and the current limit delay time period; and
   a second logic gate to indicate that a next second on time of the drive signal after the first on time is a short on time if, during a second switching period of the drive signal, the switch current of the switch exceeds the current limit after the leading edge blanking period and the second on time of the switch is less than or equal to the sum of the leading edge blanking period and the current limit delay time period.

11. The integrated circuit of claim 10, wherein the short on time detector further comprises a latch coupled to the first logic gate, and wherein the latch is coupled to be set in response to the first logic gate indicating that the first on time of the drive signal is a short on time.

12. The integrated circuit of claim 11, wherein the short on time detector further comprises a long pulse detector coupled to reset the latch if an on time of the drive signal is greater than the sum of the leading edge blanking period and the current limit delay time period.

13. The integrated circuit of claim 8, further comprising an oscillator to change the switching frequency of the drive signal from the first frequency to the lower second frequency in response to the output of the short on time detector indicating that consecutive on times of the drive signal are short on times.

14. The integrated circuit of claim 13, wherein the oscillator changes the switching frequency back to the first frequency at the start of the next switching period of the drive signal after the consecutive short on times.

15. The integrated circuit of claim 8, wherein the switch is included in the integrated circuit.

* * * * *